United States Patent
Dean et al.

(10) Patent No.: US 9,415,791 B1
(45) Date of Patent: Aug. 16, 2016

(54) STEERING WHEEL ASSEMBLY FOR A VEHICLE

(71) Applicant: FORD GLOBAL TECHNOLOGIES, LLC, Dearborn, MI (US)

(72) Inventors: Michael Joseph Dean, Westland, MI (US); James Robert Chascsa, Oakland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/613,405

(22) Filed: Feb. 4, 2015

(51) Int. Cl.
*B62D 1/04* (2006.01)
*B62D 1/11* (2006.01)

(52) U.S. Cl.
CPC ........................................ *B62D 1/11* (2013.01)

(58) Field of Classification Search
CPC .............. B62D 1/08; B62D 1/10; B62D 1/11; B29L 2031/3047; F16F 7/04; G05G 1/08; Y10T 74/20834
See application file for complete search history.

(56) References Cited

U.S. PATENT DOCUMENTS

| | | | |
|---|---|---|---|
| 1,943,915 A | 9/1932 | Geyer | |
| 2,128,069 A | 8/1936 | Ashby | |
| 2,623,405 A | 11/1950 | Sampson | |
| 2,683,383 A * | 7/1954 | Schmid | B62D 1/11 74/552 |
| 3,992,041 A * | 11/1976 | Vernocchi | B62D 1/04 280/750 |
| 4,116,087 A * | 9/1978 | Zeller | B62D 1/11 188/371 |
| 4,712,446 A * | 12/1987 | Kamata | B62D 1/04 74/492 |
| 4,829,848 A * | 5/1989 | Shinto | B62D 1/11 280/750 |
| 4,909,097 A * | 3/1990 | Henigue | B62D 1/11 280/750 |
| 5,040,646 A * | 8/1991 | Drefahl | B62D 1/11 188/371 |
| 5,356,178 A * | 10/1994 | Numata | B60R 21/203 188/377 |
| 6,736,423 B2 * | 5/2004 | Simonian | B62D 7/222 280/731 |
| 6,752,039 B2 * | 6/2004 | Kreuzer | B60R 21/2037 74/552 |
| 7,213,486 B2 | 5/2007 | Lorenz | |

FOREIGN PATENT DOCUMENTS

DE 102011050521 A1 11/2012

OTHER PUBLICATIONS

English translation of DE102011050521.

* cited by examiner

*Primary Examiner* — Adam D Rogers
(74) *Attorney, Agent, or Firm* — Vinchit Chea; King & Schickli, PLLC

(57) ABSTRACT

A steering wheel assembly includes an armature having a hub, a rim and at least two spokes extending between the hub and the rim, and a damper. The damper connects the at least two spokes and the hub and prevents contact between the spokes and hub. The at least two spokes and hub may include interdigitating projections which the damper prevents from contacting one another. The damper substantially fills a gap between the interdigitating projections and envelops the interdigitating projections. In one embodiment, the damper is annular and the interdigitating projections extend radially and include a base and a distal end having a length greater than a length of the base.

20 Claims, 6 Drawing Sheets

STEERING WHEEL ASSEMBLY FOR A VEHICLE

TECHNICAL FIELD

This document relates generally to steering wheel assemblies used in vehicles, and more specifically to a steering wheel assembly having damping capabilities.

BACKGROUND

Steering wheel assemblies are a common component of vehicles and typically include a metal armature, or core, covered by a resin and an outer covering. The armature itself includes a central hub, an outer rim and a number of spokes connecting the rim to the hub in a continuous fashion. Within the vehicle, the steering wheel armature is connected to a steering column or shaft, which is connected through track rods and steering arms of the steering system, or through other known arrangements, to the wheels of the vehicle. When unwanted attributes (e.g., vibrations, nibble, and resonance) are generated during driving, these attributes are transmitted back through the connected sub-components of the steering system and ultimately through the hub, spokes and rim to the hands of the operator of the vehicle.

Prior attempts to reduce or eliminate such unwanted attributes typically involved adding or subtracting mass from the steering wheel assembly in an effort to dampen the attributes. Others included adding individual dampers between the hub and the spokes of the armature. U.S. Pat. No. 2,128,069 to Ashby U.S. Pat. No. 1,056,813 describes a four spoke steering wheel wherein the spokes are steel wires which extend into rubber bushing inserts positioned within a hub of the steering wheel. The four bushings described are locked into position within the hub by a clamping ring secured over the bushings and bolted to the hub. Similarly, U.S. Pat. No. 2,623,405 to Sampson describes a steering wheel assembly with three spokes which extend into rubber bushing inserts positioned with a hub of the steering wheel. The bushings are force fitted into sleeves connected to the hub to provide individual damping of each spoke. While these attempts are capable of reducing unwanted attributes, each involves the addition of several parts to the steering wheel assembly which increases manufacturing times and costs in both labor and parts.

Accordingly, a need exists for a steering wheel assembly capable of reducing or eliminating such unwanted attributes without increasing manufacturing times and costs. Such a steering wheel assembly would necessarily isolate the hub and the spoke from contact. Isolation would preferably be accomplished with a minimum of additional parts and effect on the manufacturing process and the need for additional service.

SUMMARY OF THE INVENTION

In accordance with the purposes and benefits described herein, a steering wheel assembly is provided. The steering wheel assembly may be broadly described as comprising an armature having a hub, a rim and at least two spokes extending between the hub and the rim, and a damper connecting the at least two spokes and the hub. In one possible embodiment, the at least two spokes and the hub include interdigitating projections and the damper prevents contact between the interdigitating projections.

In one other possible embodiment, a first portion of the interdigitating projections extend radially from the hub toward the at least two spokes, and a second portion of the interdigitating projections extend radially from the at least two spokes toward the hub.

In another possible embodiment, the damper is annular. In another, the interdigitating projections include a base and a distal end having a length greater than a length of the base.

In still another possible embodiment, a first portion of the interdigitating projections extend linearly from the hub, and a second portion of the interdigitating projections extend linearly from the at least two spokes.

In yet another possible embodiment, the damper substantially fills a gap between the interdigitating projections. In still another, the damper envelops the interdigitating projections.

In accordance with another aspect of the invention, a steering wheel assembly includes an armature having a hub, and a rim connected to first and second spokes extending toward the hub, and a damper supported by the hub and spanning a gap between the first and second spokes and the hub, wherein the first and second spokes and the hub include interdigitating projections and the damper prevents contact between the interdigitating projections.

In one possible embodiment, the damper is annular. In another, the interdigitating projections extend radially from a side of the hub. In still another, the interdigitating projections include a base and a distal end having a length greater than a length of the base.

In another possible embodiment, the hub includes upper and lower surfaces and the damper extends above the upper surface and below the lower surface.

In still another possible embodiment, the interdigitating projections extend linearly from a side of the hub. In another, the damper is a parallelogram. In still another, the damper substantially fills the gap between the interdigitating projections. In another, the at least two spokes include upper and lower arms.

In one other possible embodiment, the hub includes upper and lower surfaces and the damper extends above the upper surface and below the lower surface.

In accordance with another possible embodiment, a steering wheel assembly includes a hub having a plurality of projections, an outer rim, at least two spokes connected to the rim and extending toward the hub, each of the at least two spokes having a plurality of projections extending toward the hub and interlocking with the plurality of projections of the hub, and a damper supported by the hub for securing at least a portion of the interlocking projections without contact between the plurality of projections of the hub and the projections of each the at least two spokes.

In the following description, there are shown and described several preferred embodiments of the steering wheel assembly. As it should be realized, the assemblies are capable of other, different embodiments and their several details are capable of modification in various, obvious aspects all without departing from the assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the steering wheel assembly and together with the description serve to explain certain principles thereof. In the drawing figures.

Reference will now be made in detail to the present preferred embodiments of the steering wheel assemblies, examples of which are illustrated in the accompanying drawing figures, wherein like numerals are used to represent like elements.

DETAILED DESCRIPTION

Figure 1:
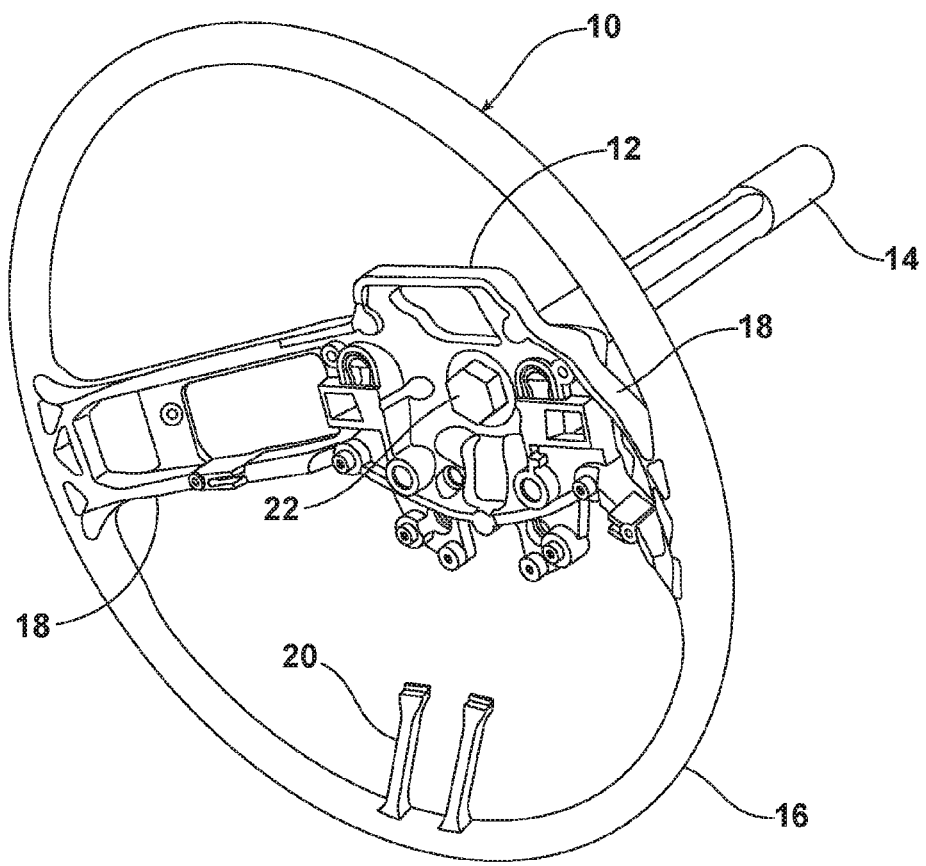
FIG. 1 is a perspective view of a typical steering wheel armature connected at a central hub to a partially shown steering column assembly.

Reference is now made to FIG. 1 which illustrates a typical steering wheel armature 10 connected at a central hub 12 to a partially shown steering column assembly 14. As shown, the armature 10 includes the central hub 12, an outer rim 16, and two spokes 18 extending between the hub and the rim. A third, partial spoke 20 is shown adjacent a lower portion of the outer rim 16. The central hub 12, outer rim 16, and spokes 18 form a continuous structure, or steering wheel armature 10, which is rigidly attached to the steering column assembly 14 by a bolt 22. In this arrangement, any unwanted vibrations, nibble or modal alignment is input into the central hub 12 and transmitted through the spokes 18 to the outer rim 16 and the driver's hands.

Figure 2:
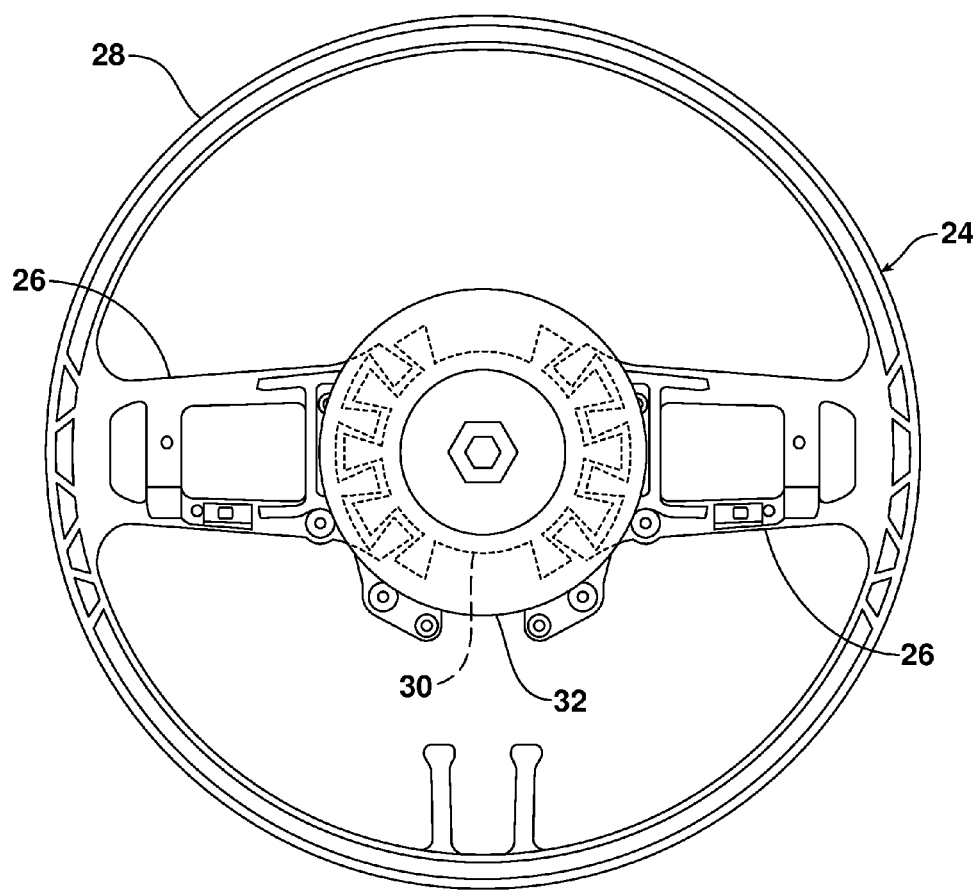
FIG. 2 is a front plan view of a steering wheel assembly showing the armature and a doughnut shaped damper connecting a hub to a pair of spokes.

In order to eliminate or reduce the transmission of such unwanted attributes to the driver, a steering wheel assembly 24 includes an additional interface joint. The interface joint is positioned between a pair of spokes 26 extending from an outer ring 28, and a central hub 30. As shown in FIG. 2, a damper 32 covers the interface joint in the described embodiment. The damper 30 may be a solid or laminated rubber and is annular such that the interface joint between each of the spokes 26 and the central hub 30 is covered by the damper 30. In the described embodiment, the damper 30 is doughnut shaped. Other embodiments may include additional spokes extending between the outer ring 28 and the central hub 30 with each such additional spoke being isolated from the central hub and covered by the damper 32. In addition, the density of the rubber material used in the damper 30 may be adjusted to balance manufacturing costs and the limitation and/or removal of the unwanted attributes.

Figure 3:
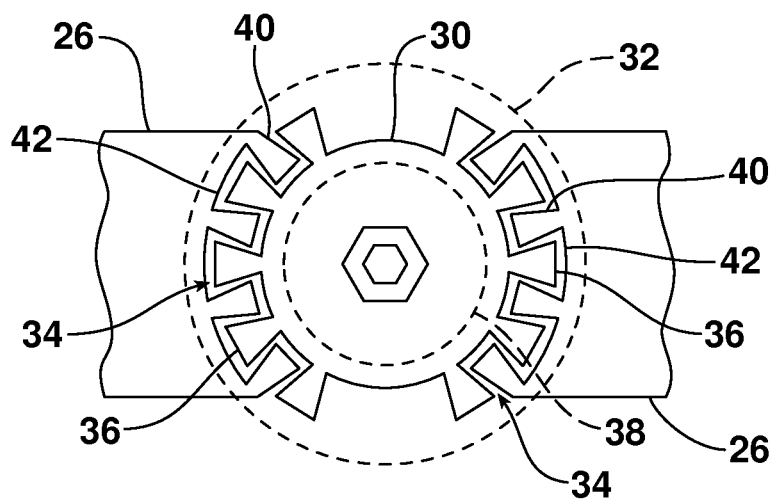
FIG. 3 is a partial front plan view of the steering wheel assembly showing interdigitating projections radially extending from the hub and the pair of spokes.

As shown in FIG. 3, the interface joint 34, which is essentially an air gap, is formed between interdigitating projections which prevents contact between the spokes 26 and the hub 30. Specifically, a first portion of the interdigitating projections 36 extend radially from either side of the hub 30 generally toward the spokes 26. More specifically, the projections 36 extend radially from an outer surface or side 38 of the hub 30. A second portion of the interdigitating projections 40 extend radially from each of the spokes 26 toward the hub 30. Again, the projections 40 extend radially from an outer surface or side 42 of the spokes 26. The damper 32 (shown in dashed lines) essentially fills the interface joint 34 preventing contact between the projections 36 and 40 and limiting the transmission of the unwanted attributes from the hub 30 to the spokes 26.

Figure 4:
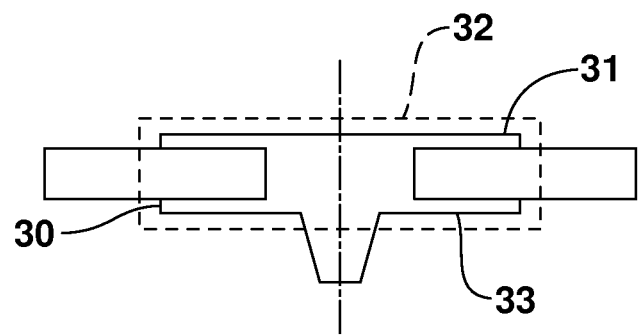
FIG. 4 is a side elevational view the steering wheel assembly including the damper.

As shown in FIG. 4, the hub 32 includes an upper surface 31 and a lower surface 33 and damper 32 extends above the upper surface and below the lower surface. As shown in FIGS. 3 and 4, the damper 32 envelops the interdigitating projections 36 and 40. In other words, the damper 32 substantially fills the air gap between the interdigitating projections and covers the top and bottom surfaces of the interdigitating projections.

Figure 5:
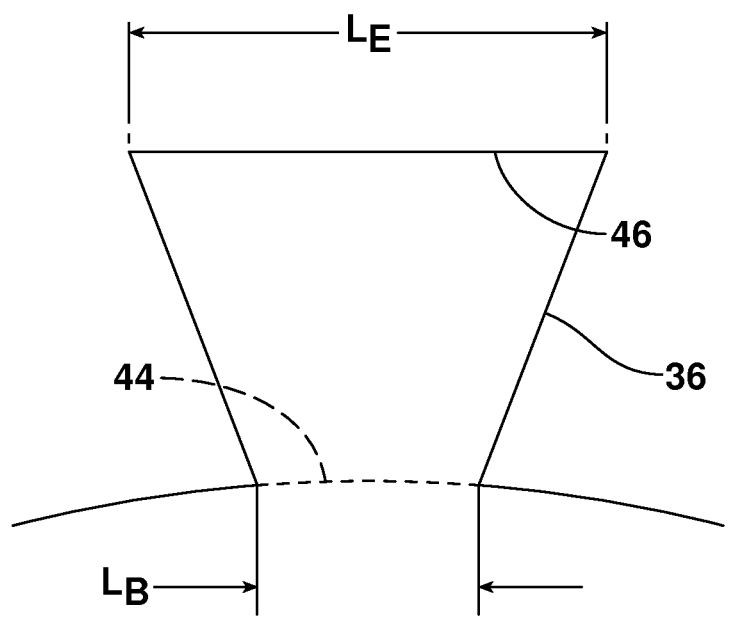
FIG. 5 is an illustration showing a shape of one of the interdigitating projections.

As shown in FIG. 5, the projections 36 and 40 include a base 44 and a distal end 46 having a length $L_E$ greater than a length of the base $L_B$. The length of the base 44 and distal end 46 may vary between hub projections 36 and spoke projections 40 depending on design choice or may all be the same within a steering wheel assembly. The differing lengths, however, allow the hub projections 36 and spoke projections 40 to form a formidable bond when the damper 32 fills the gaps formed there between.

Figure 6:
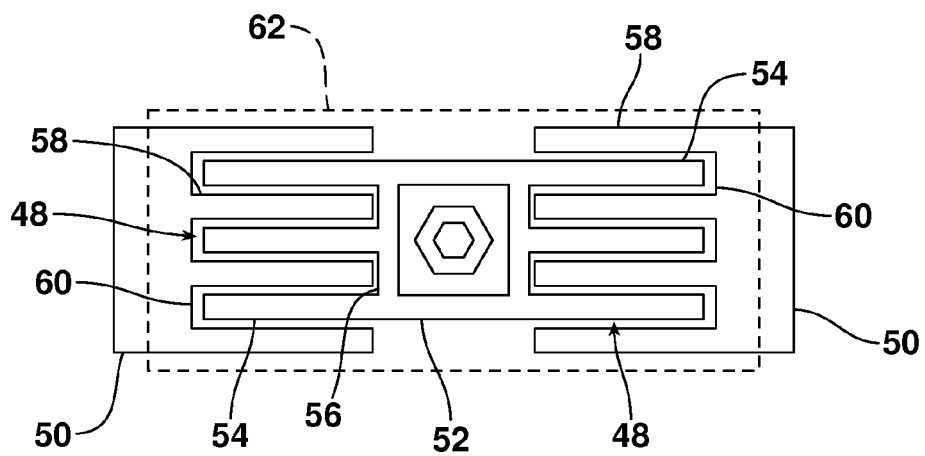
FIG. 6 is a partial front plan view of an alternate embodiment of the steering wheel assembly showing interdigitating projections linearly extending from the hub and the pair of spokes.
Figure 7:
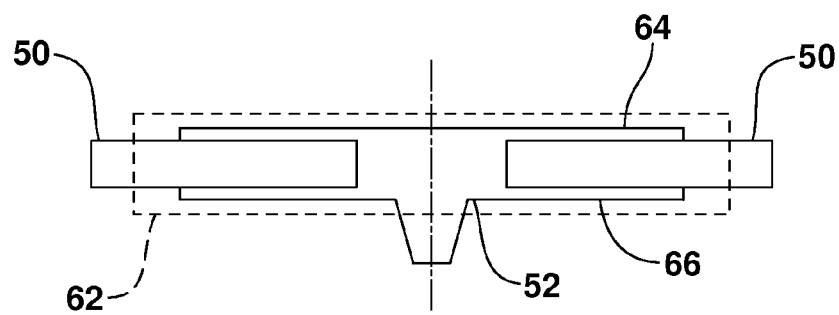
FIG. 7 is a side elevational view the alternate embodiment steering wheel assembly including the damper.

Of course, the hub projections and spoke projections could take any number of shapes including, for example, a linear shape as shown in FIG. 6. In this embodiment, an interface joint 48, which is again an air gap, is formed between interdigitating projections which prevents contact between spokes 50 and a hub 52. Specifically, a first portion of the interdigitating projections 54 extend linearly from either side of the hub 52 generally toward the spokes 50. More specifically, the projections 54 extend linearly from an outer surface or side 56 of the hub 52. A second portion of the interdigitating projections 58 extend linearly from each of the spokes 50 toward the hub 52. Again, the projections 58 extend linearly from an outer surface or side 60 of the spokes 50.

A damper 62 (shown in dashed lines) covers and essentially fills the interface joint 48 in the described alternate embodiment preventing contact between the projections 54 and 58, and limiting the transmission of the unwanted attributes from the hub 52 to the spokes 50. In other words, the damper 62 substantially fills the air gap between the interdigitating projections 54 and 58 and envelops them and covers a top surface 64 and a bottom surface 66 of the hub 52. The damper 62 may be a solid or laminated rubber and is generally rectangular such that the interface joint 48 between each of the spokes 50 and the central hub 52 is covered by the damper.

Figure 8:
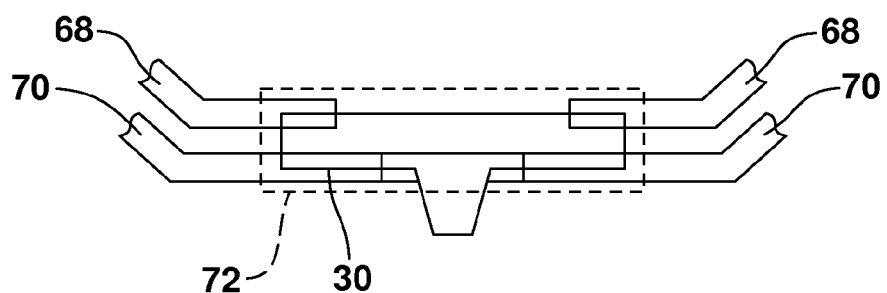
FIG. 8 is a side elevational view of an alternate embodiment of the steering wheel assembly including the damper and upper and lower arms forming the spokes.

In an alternate embodiment shown in FIG. 8, the spokes include an upper arm 68 and a lower arm 70. Specifically, a first portion of interdigitating projections 36 extend radially from either side of the hub 30 generally toward the upper and lower arms 68, 70. More specifically, the projections 36 extend radially from an outer surface or side 38 of the hub 30. A second portion of interdigitating projections 40 extend radially from each of the upper and lower arms 68, 70 toward the hub 30. Again, the projections 40 extend radially from an outer surface or side 42 of the upper and lower arms 68, 70. A damper 72 (shown in dashed lines) essentially fills the interface joint preventing contact between the projections 36 and 40 of the upper and lower arms 68, 70 and limits the transmission of the unwanted attributes from the hub 30 to the upper and lower arms 68, 70.

Figure 9:
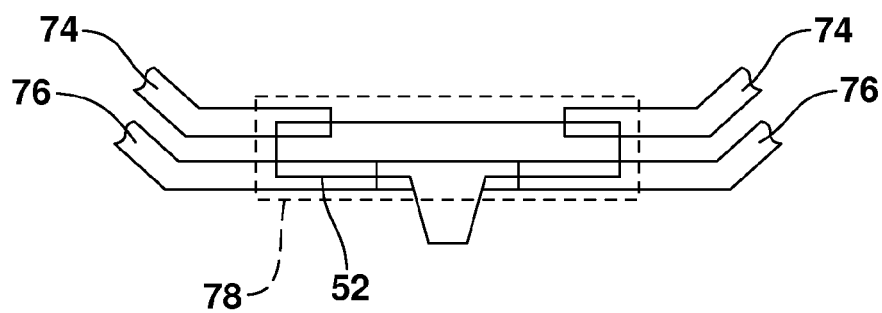
FIG. 9 is a side elevational view of an alternate embodiment of the steering wheel assembly including the damper and upper and lower arms forming the spokes.

In an alternate embodiment shown in FIG. 9, the spokes include an upper arm 74 and a lower arm 76. Specifically, a first portion of interdigitating projections 54 extend linearly from either side of the hub 52 generally toward the upper and lower arms 74, 76. More specifically, the projections 54 extend linearly from an outer surface or side 56 of the hub 52. A second portion of interdigitating projections 58 extend linearly from each of the upper and lower arms 74, 76 toward the hub 52. Again, the projections 58 extend linearly from an outer surface or side 60 of the upper and lower arms 74, 76. A damper 78 (shown in dashed lines) essentially fills the interface joint preventing contact between the projections 54 and 58 of the upper and lower arms 74, 76 and limits the transmission of the unwanted attributes from the hub 52 to the upper and lower arms 74, 76.

In summary, numerous benefits result from a steering wheel assembly as illustrated in this document. The steering wheel assembly is capable of reducing or eliminating unwanted attributes without increasing manufacturing times and costs. Such a steering wheel assembly would necessarily isolate the hub and the spoke from contact. Isolation would preferably be accomplished with a minimum of additional parts and effect on the manufacturing process and the need for additional service.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. A steering wheel assembly, comprising:
   an armature having a hub, a rim and at least two spokes extending between said hub and said rim, wherein each of said at least two spokes and said hub include interdigitating projections; and
   a solid rubber damper connecting said at least two spokes and said hub,
   wherein said damper prevents contact between said interdigitating projections of said at least two spokes and said hub.

2. The steering wheel assembly of claim 1, wherein a first portion of said interdigitating projections extend radially from said hub toward said at least two spokes.

3. The steering wheel assembly of claim 2, wherein a second portion of said interdigitating projections extend radially from said at least two spokes toward said hub.

4. The steering wheel assembly of claim 3, wherein said damper is annular.

5. The steering wheel assembly of claim 4, wherein said interdigitating projections include a base and a distal end having a length greater than a length of said base.

6. The steering wheel assembly of claim 1, wherein a first portion of said interdigitating projections extend linearly from said hub.

7. The steering wheel assembly of claim 6, wherein a second portion of said interdigitating projections extend linearly from said at least two spokes.

8. The steering wheel assembly of claim 1, wherein said at least two spokes include upper and lower arms.

9. The steering wheel assembly of claim 1, wherein said damper envelops said interdigitating projections.

10. A vehicle incorporating the steering wheel assembly of claim 9.

11. A steering wheel assembly, comprising:
    an armature having a hub, and a rim connected to first and second spokes extending toward said hub; and
    a damper supported by said hub and spanning a gap between said first and second spokes and said hub,
    wherein each of said first and second spokes and said hub include interdigitating projections and said damper prevents contact between said interdigitating projections.

12. The steering wheel assembly of claim 11, wherein said damper is annular.

13. The steering wheel assembly of claim 12, wherein said interdigitating projections extend radially from a side of said hub.

14. The steering wheel assembly of claim 13, wherein said interdigitating projections include a base and a distal end having a length greater than a length of said base.

15. The steering wheel assembly of claim 11, wherein said hub includes upper and lower surfaces and said damper extends above said upper surface and below said lower surface.

16. The steering wheel assembly of claim 15, wherein said interdigitating projections extend linearly from a side of said hub.

17. The steering wheel assembly of claim 11, wherein each of said first and second spokes include upper and lower arms.

18. A steering wheel assembly, comprising:
    a hub having a plurality of projections,
    an outer rim,
    at least two spokes connected to said rim and extending toward said hub, each of said at least two spokes having a plurality of projections extending toward said hub and interlocking with said plurality of projections of said hub; and
    a damper supported by said hub for securing at least a portion of said plurality of projections of said hub and said projections of each of said at least two spokes without contact between said plurality of projections of said hub and said projections of each of said at least two spokes.

19. The steering wheel assembly of claim 18, wherein said damper envelops said projections.

20. The steering wheel assembly of claim 18, wherein said hub includes upper and lower surfaces and said damper extends above said upper surface and below said lower surface.

* * * * *